Figure 7:
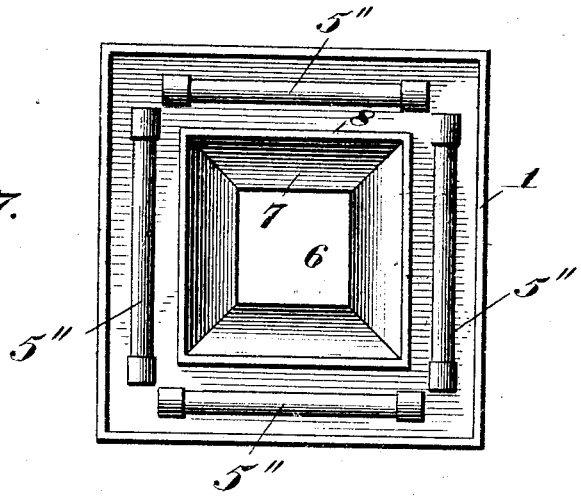

No. 767,571. PATENTED AUG. 16, 1904.
T. J. LANDE.
DEVICE FOR MAKING BROMID ENLARGEMENTS.
APPLICATION FILED DEC. 21, 1903.
NO MODEL. 3 SHEETS—SHEET 1.
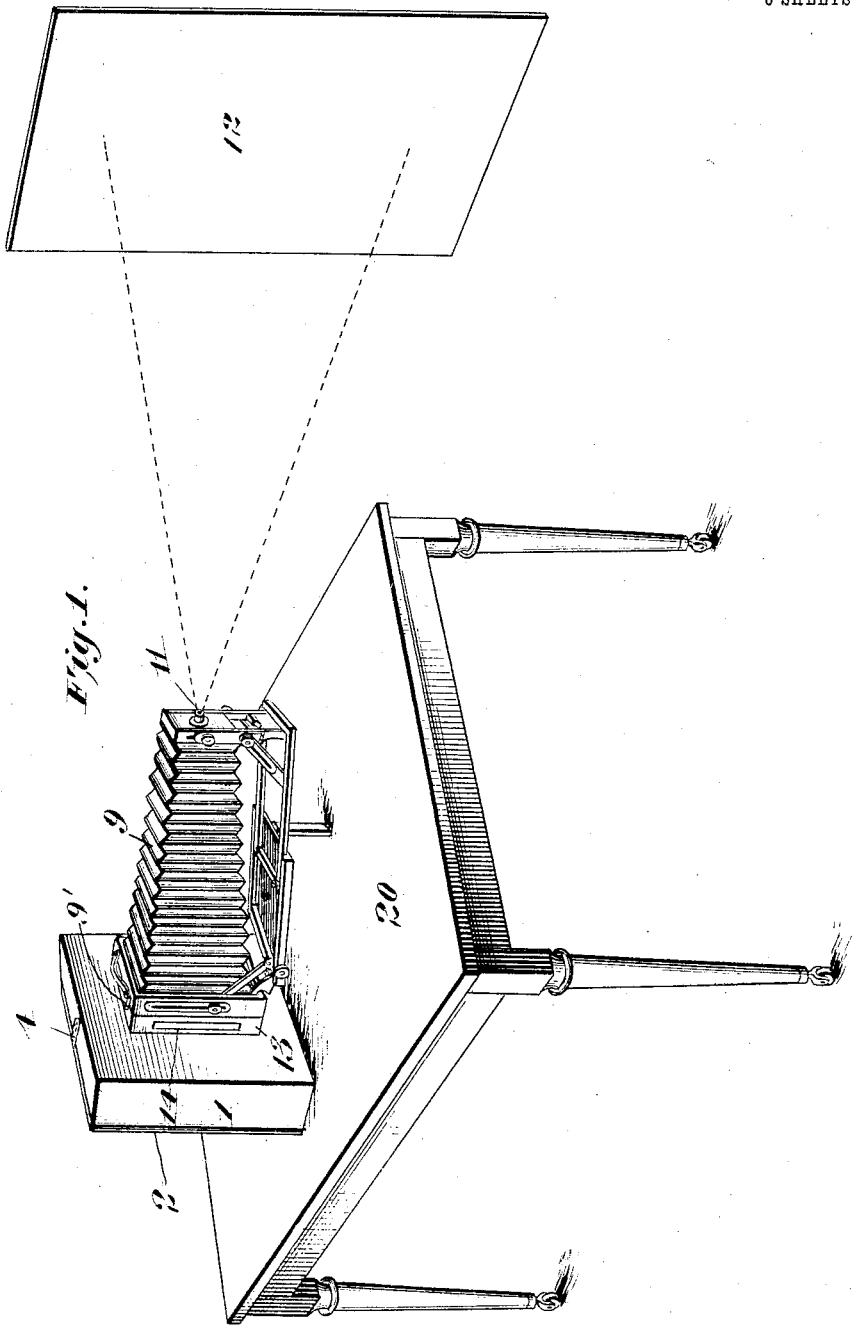

No. 767,571. PATENTED AUG. 16, 1904.
T. J. LANDE.
DEVICE FOR MAKING BROMID ENLARGEMENTS.
APPLICATION FILED DEC. 21, 1903.
NO MODEL. 3 SHEETS—SHEET 2.
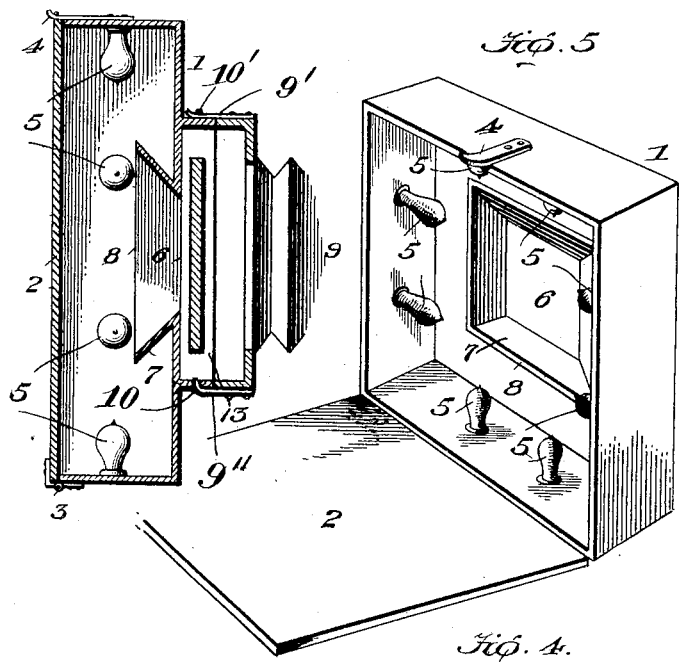
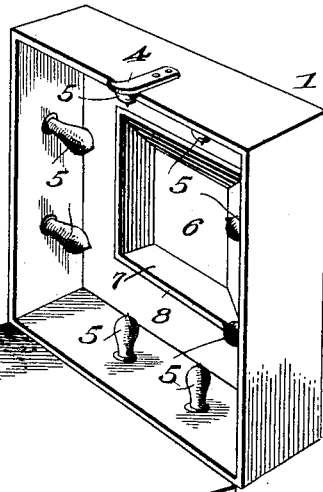
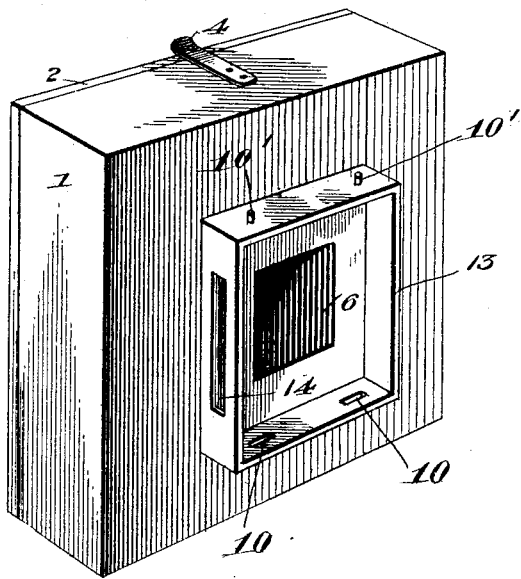
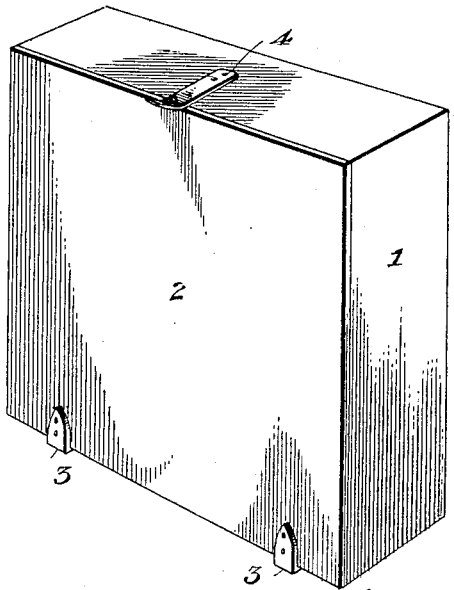

No. 767,571. PATENTED AUG. 16, 1904.
T. J. LANDE.
DEVICE FOR MAKING BROMID ENLARGEMENTS.
APPLICATION FILED DEC. 21, 1903.
NO MODEL. 3 SHEETS—SHEET 3.

Witnesses
Elmer Leavey
Sarah V. Lockwood

Inventor
Thomas Jones Lande
by Geo. Hamlin
Attorney

No. 767,571.  
Patented August 16, 1904.

UNITED STATES PATENT OFFICE.

THOMAS JONES LANDE, OF NEW YORK, N. Y.

DEVICE FOR MAKING BROMID ENLARGEMENTS.

SPECIFICATION forming part of Letters Patent No. 767,571, dated August 16, 1904.

Application filed December 21, 1903. Serial No. 186,022. (No model.)

*To all whom it may concern:*

Be it known that I, THOMAS JONES LANDE, a citizen of the United States, residing at New York, county of New York, and State of New York, have invented certain new and useful Improvements in Devices for Making Bromid Enlargements, of which the following is a specification.

This invention relates to devices for making bromid enlargements from photographic negatives by artificial light without the use of condensing-lenses.

In making bromid enlargements from photographic negatives by artificial light the apparatus in general use by photographers is arranged as follows: A pair of condensing-lenses equal in diameter to the diagonal of the negative is set in the wall of a dark room and a camera is attached to the inside wall of the dark room before the condensing-lenses and arranged so that it can be properly focused upon a sliding screen which can be extended to the desired size by sliding the same, whereby an image of any desired size can be had on the screen. The negative is introduced in the camera in front of the condensing-lenses, and on the outside of the dark room an electric-arc light is placed, the light from which is condensed by the condensing-lenses, which causes the light to fall uniformly and with perfect evenness on the surface of the negative, thus producing a perfect negative image on the screen. The objection to this apparatus is that the condensing-lenses are quite expensive, as are also the other appurtenances, and the operator must necessarily be in the dark room.

My object is to dispense with condensing-lenses in making bromid enlargements from photographic negatives by artificial light and to provide a simple and comparatively inexpensive device for producing bromid enlargements from a negative of any size and obtain a superior class of work.

My object in the provision of this invention is to provide an apparatus for bromid enlargements which can be used with any kodak or camera in the possession of any amateur photographer, said device being light and portable and adapted for use in an ordinary living-room at night or with darkened windows.

To accomplish the foregoing object, the invention contemplates the provision of a box preferably having a white interior provided with a closure and a condensing-opening of novel construction, together with artificial lights in the interior of the box, said box being adapted for attachment to an ordinary camera or kodak in an improved manner, whereby the artificial light within the box is directed on the negative in the camera with perfect evenness and uniformity, as set forth fully hereinafter, while the novel features of the invention are embodied in the appended claims.

Figure 6:
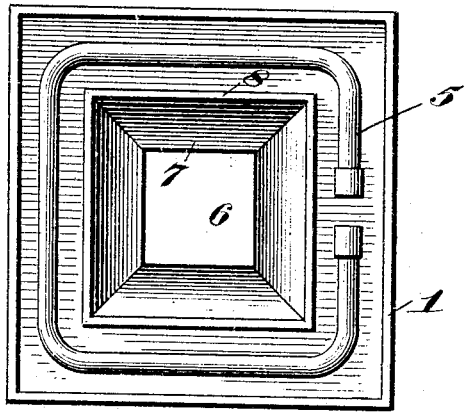
Figure 8:
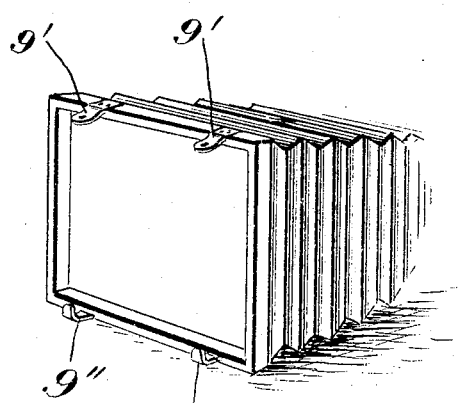

In the accompanying drawings, Figure 1 is a perspective view showing the general arrangement of the invention and its manner of use. Fig. 2 is a detail vertical section through the box, showing the use of incandescent lights. Figs. 3 and 4 are detail perspective views, respectively, of the front and rear of the box detached from the camera. Fig. 5 is a rear perspective view of the box, showing the door down and disclosing the interior. Figs. 6 and 7 are rear interior views of the box, illustrating the use of the Cooper-Hewett vacuum-tube light therewith; and Fig. 8 is a detail view of the rear end of the camera, showing the connecting devices thereon.

The numeral 1 designates a box, in the present instance square, of sheet metal, which is perfectly light-tight, said box being of a convenient size for attachment to an ordinary kodak or camera and having a door or closure 2 hinged at 3 and provided with a suitable latch or catch 4. By preference the interior of this box and the inner face of the door are painted white to obtain the greatest possible evenness of diffusion of the light, and the box and door are so constructed that the entire device is light-tight. Arranged on the inner walls of the box are incandescent lights 5, it being preferable to provide the same number of lights on one side of the box as on any other side to obtain the proper diffusion of the light. These lights will be suitably wired and receive their current from any desired source.

The invention can be adapted for the use of Welsbach burners in place of the incandescent lights 5 if suitable ventilation through the box is provided, and for large plates for professional use the box can be made to use what is known to the trade as the "Cooper-Hewett vacuum-tube light," as shown in Figs. 6 and 7, which I have found to give results superior to daylight in the quality of work produced and the speed with which such enlarging work can be turned out. This light can be arranged in a circle, as shown at 5' in Fig. 6, or four tubes 5'' can be used, as shown in Fig. 7. If only two opposite tubes of the four shown in Fig. 7 be used, very good results are obtainable. In the front of the box—that is, the side opposite the door 2—is a square opening 6, whose sides are of a length equivalent to the longest side of the largest negative intended to be used in connection with the device. Whatever size of negative the apparatus is primarily intended to be used with, any smaller size of negative can be used by employing kits, so that a negative of any size can be used.

Connected to the inner wall of the front of the box 1 and flaring from the margin or sides of the opening 6 is a collector 7, of sheet metal and suitably fastened to the box, said collector being in the shape of the frustum of a pyramid, with its larger open base 8 in the interior of the box and its smaller base being the opening 6, for it will be understood that this collector is a hollow device projecting into the interior of the box, and its purpose is to collect the light emanating from the lamps 5, 5', or 5'' and direct it with perfect evenness onto the negative. This collector is also preferably painted white.

The attachment as thus described is intended for use in connection with an ordinary camera or kodak 9, which is adapted for detachable light-tight engagement or connection to the front of the box, so that the collector 7 will be positioned relatively to the negative in the camera to evenly and perfectly direct the light which floods the interior of the box 1 onto the negative and project a perfect image through the lens 11 of the camera onto the screen, wall, or other surface 12 on which the bromid paper is to be fastened.

The camera and attachment forming the subject-matter of this invention can be set up in any living-room at night or in a room the windows of which have been darkened.

In the flange 13, which surrounds the rear end of the camera where the latter is connected to the front of the box, a slot 14 is provided for the introduction and removal of the negative-holder in the back of the camera and in the front of the opening 6.

To adapt the invention for use with any ordinary type of kodak or camera, I have provided slots 10 in the bottom portion of the flange 13 and pins 10' on the upper portion of said flange. The ordinary types of reversible-back cameras have apertured springs 9' on the upper part of the rear frame thereof and hooks 9'' on the lower part, as shown in Fig. 8, in order to provide for reversing of the back of the camera to take exposures lengthwise or crosswise thereof. The slots 10 and pins 10' are provided for detachable engagement with the hooks 9'' and springs 9' on the camera. In attaching the ordinary camera, equipped as shown in Fig. 8, to the flange 13 the hooks 9'' are entered upwardly in the slots 10 and the springs 9' snapped over the pins 10', thus holding the back of the camera 9 firmly and detachably against the flange 13.

In using the invention the camera is connected to the box 1 and both are supported by a table 20. The negative-holder is then inserted through the slot 14 and the lights 5, 5', or 5'' turned on and the slides removed from the negative-holder to expose the negative to the light in the box 1, the door having been closed and caught by the latch 4. By moving the table 20 or by moving the camera and its attachment on top of the table and by focusing the camera itself the image of the desired size and clearness is thrown on the wall or screen 12 in the darkened room in which the operation is being conducted. A cap in which a piece of yellow or orange glass is set is placed over the lens 11. After the image has been focused the image can then be seen; but the light is rendered non-actinic by the orange or yellow glass. The bromid paper can then be easily placed in correct position on the screen or wall 12, and when the cap is removed the white light falls on the bromid paper and the image is thus taken thereon and the operation is complete. During the foregoing operation the collector 7 directs the light which is flooding the interior of the box onto the negative, and the arrangement is such that the light is directed with great evenness of intensity and uniformity of diffusion on the negative.

The present invention dispenses entirely with the use of expensive condensing-lenses heretofore used by photographers, and also the use of the arc-light is obviated.

The attachment is portable, simple, and inexpensive and makes it possible for amateur as well as professional photographers to make bromid enlargements easily and at small expense.

Having thus described my invention, what I claim as new, and desire to secure by Letters Patent, is—

1. The combination with a camera, of an attachment for making bromid enlargements comprising a box attached thereto having means whereby the interior thereof may be lighted, an opening for directing the light on the negative, and a collector of general funnel or tapering shape for directing the light to said opening.

2. The combination with a camera, of an attachment for making bromid enlargements comprising a box attached thereto having means whereby the interior thereof may be lighted, an opening for directing the light on the negative, and a hollow collector of general pyramidal shape for directing the light to said opening.

3. The combination with a camera, of an attachment for making bromid enlargements comprising a box attached thereto having an opening for directing the light on the photographic negative, artificial lighting means located within and connected to the box, and a funnel-shaped collector within and connected to the box for directing the light from the interior of the box to the opening aforesaid.

4. The combination with a camera, of an attachment for making bromid enlargements comprising a box attached thereto having an opening for directing the light on the photographic negative, artificial lighting means located within and connected to the box, and a hollow collector of general pyramidal form within and connected to the box for directing the light to the aforesaid opening.

5. The combination with a camera, of an attachment for making bromid enlargements comprising a box attached thereto having means located therein and connected thereto whereby the interior thereof may be lighted, an opening for directing the light on the negative, and a closure for the box whereby access may be had to the interior of said box.

6. The combination with a camera, of an attachment for making bromid enlargements comprising a box having means whereby the interior thereof may be lighted, and an opening for directing the light on the negative to project the image outside the camera, said box having its interior of a substantially white color.

7. The combination with a camera, of an attachment for making bromid enlargements comprising a box having means whereby the interior thereof may be lighted, an opening for directing the light on the negative to project the image outside the camera, and a detachable connection between the box and the back of the camera.

8. The combination with a camera, of an attachment for making bromid enlargements comprising a box having means whereby the interior thereof may be lighted, an opening for directing the light on the negative to project the image outside the camera, a collector for directing the light to said opening, and a detachable connection between the box and the back of the camera.

9. The combination with a camera, of an attachment for making bromid enlargements comprising a box having an opening for directing the light on the photographic negative to project the image outside the camera, means for providing the interior of the box with artificial light, and a detachable connection between the box and the back of the camera.

10. The combination with a camera, of an attachment for making bromid enlargements comprising a box having means whereby the interior thereof may be lighted, an opening for directing the light on the negative to project the image outside the camera, a flange on the box surrounding the opening aforesaid, and means for detachably connecting the back of the camera to said flange.

11. The combination with a camera, of an attachment for making bromid enlargements comprising a box abutting the rear frame or back of the camera, means for detachably engaging the back of the camera and the box, means for lighting the interior of the box, said box having an opening for directing the light on the negative to project the image outside the camera.

12. The combination with a camera, of an attachment for making bromid enlargements comprising a box having means whereby the interior thereof may be lighted, an opening for directing the light on the negative to project the image outside the camera, a hollow funnel-shaped collector within the box and connected to the same around the opening aforesaid to direct the light to the opening, a flange on the outside of the box surrounding the opening aforesaid, said flange abutting the back frame of the camera, and means for detachably connecting the back frame of the camera to said flange.

In testimony whereof I hereunto affix my signature in presence of two witnesses.

THOMAS JONES LANDE.

Witnesses:
S. VAN HORN,
JOSEPH J. COHEN.